April 9, 1957  J. L. BECKER  2,788,140
HELICAL PARKING RAMP
Filed Sept. 13, 1954  4 Sheets-Sheet 1
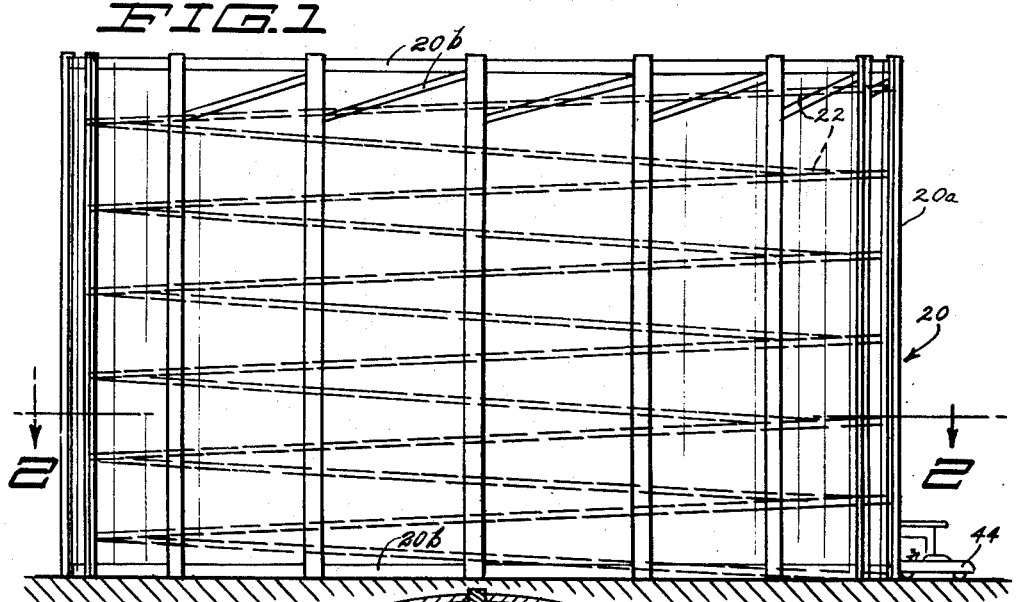
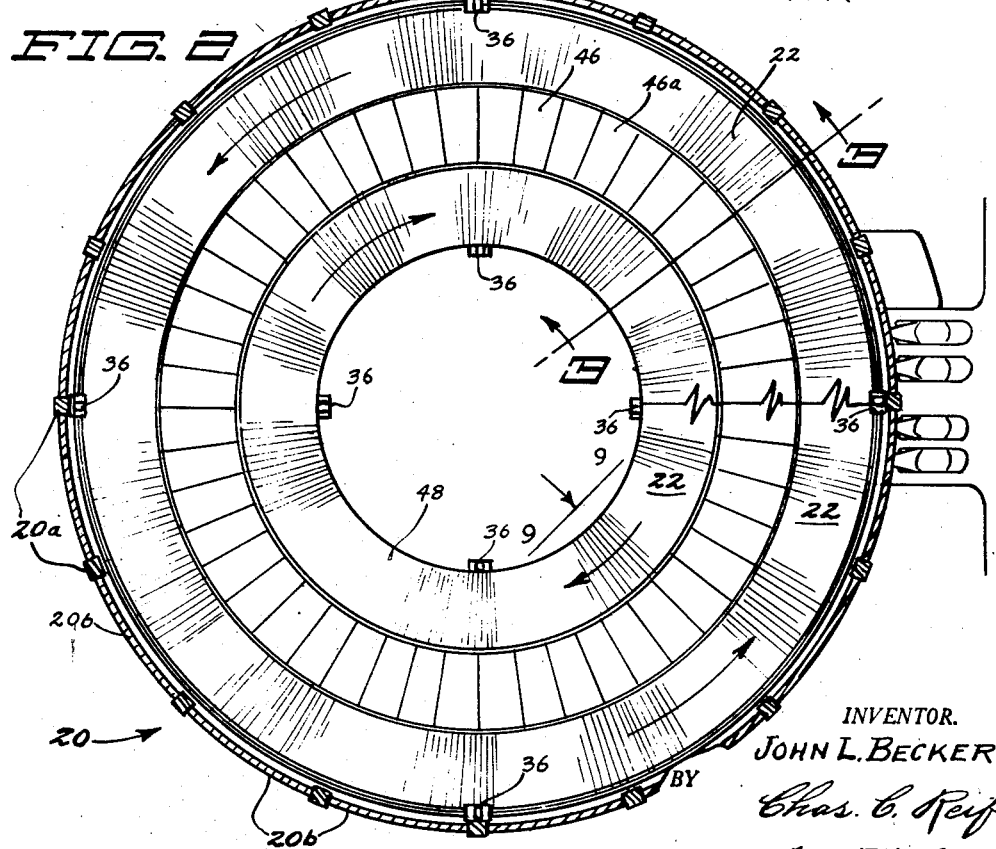
INVENTOR.
JOHN L. BECKER
BY Chas. C. Reif
ATTORNEY.

April 9, 1957  J. L. BECKER  2,788,140
HELICAL PARKING RAMP
Filed Sept. 13, 1954 4 Sheets-Sheet 2
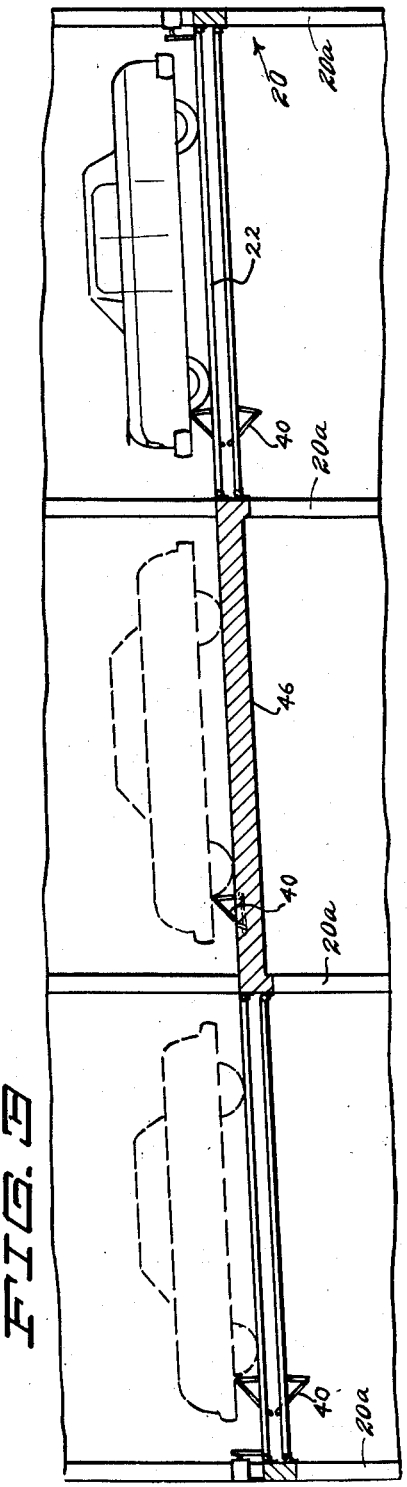
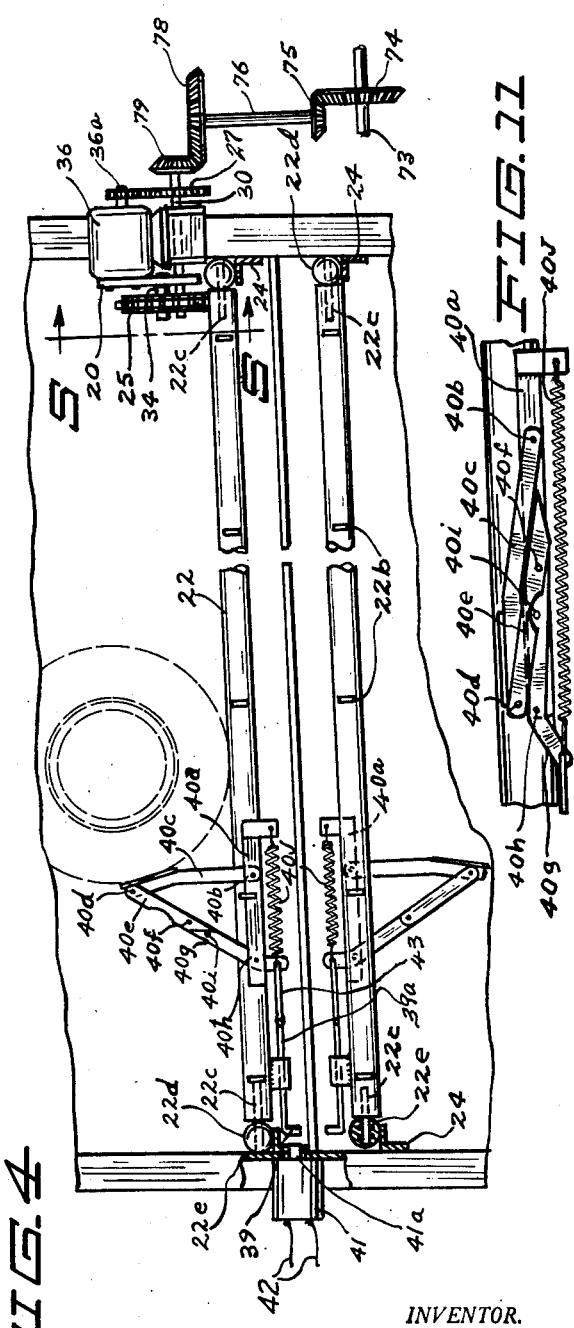
INVENTOR.
JOHN L. BECKER
BY Chas. C. Reif
ATTORNEY.

April 9, 1957    J. L. BECKER    2,788,140
HELICAL PARKING RAMP
Filed Sept. 13, 1954    4 Sheets-Sheet 3

INVENTOR.
JOHN L. BECKER
BY Chas. C. Reyf
ATTORNEY.

April 9, 1957     J. L. BECKER     2,788,140
HELICAL PARKING RAMP
Filed Sept. 13, 1954     4 Sheets-Sheet 4
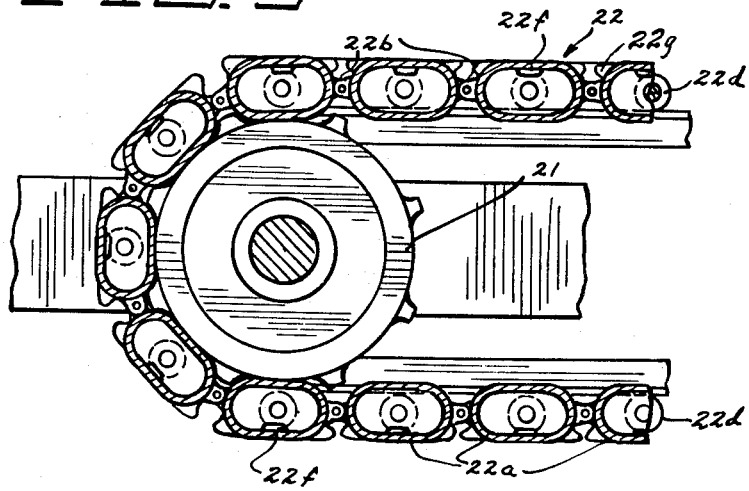
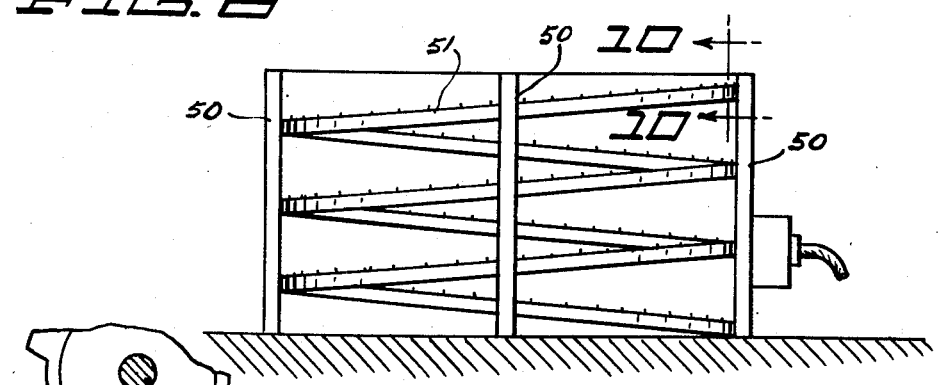
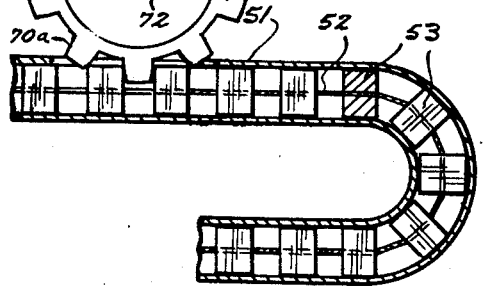
INVENTOR.
JOHN L. BECKER
BY
Chas. C. Reif
ATTORNEY.

United States Patent Office 2,788,140
Patented Apr. 9, 1957

2,788,140

HELICAL PARKING RAMP

John L. Becker, Rochester, Minn.

Application September 13, 1954, Serial No. 455,699

17 Claims. (Cl. 214—16.1)

This invention relates to an apparatus for parking automotive vehicles. Automotive vehicles have increased to such numbers that the problem of parking the same in the downtown and business sections of cities has become quite acute. Some types of parking ramps or buildings for parking have been suggested and others are in operation.

It is an object of this invention to provide an apparatus for parking automotive vehicles which will accommodate a large number of cars and will require very few attendants or operators for operating the same.

It is a further object of this invention to provide an apparatus for parking automotive vehicles which comprises a helical ramp which will extend upward through quite a number of floors of a building, together with means by which the cars can be elevated so as to be moved onto said ramp in circumferentially spaced relation.

It is also an object of the invention to provide such an apparatus as set forth in the preceding paragraph, together with means by which the cars can be individually lowered and moved down to the street level.

It is still another object of the invention to provide an apparatus for parking cars comprising an endless helical conveyor adapted to support said vehicles having its top run movable upwardly, a helical ramp at one side of said conveyor so that said vehicles on said conveyor can move onto said ramp, and a second endless helical conveyor at the opposite side of said ramp with its upper run movable downwardly and disposed so that said vehicles from said ramp may move onto said second conveyor.

It is still further an object of this invention to provide such an apparatus as set forth in the previous paragraph, together with means for retaining said vehicles on said ramp and conveyors, means for controlling said last mentioned means preferably from the street level.

Another object of the invention is to provide such as apparatus as set forth in the preceding paragraph save one, in which said ramp and said conveyors have their upper surfaces inclined downwardly preferably toward the central axis of said ramp.

It is also another object of this invention to provide such an apparatus as above set forth, together with a control device which will be located on the street level or first floor of the building in which the apparatus is disposed, said control device comprising a helical stationary member and helical endless conveyors at each side thereof with means thereon for carrying identification data for the various cars which are disposed on the above mentioned ramp and endless conveyors.

It is a further object of this invention to provide a parking ramp comprising a helical belt having its upper run moving upwardly, a stationary helical member at one side of said belt, a second helical belt having its upper run moving downwardly, said runs and the surface of said helical member being substantially in transverse alinement, means for moving said belts and a control device comprising two cables and a stationary helical member, one of said last mentioned cables having its top run moving upwardly and the other having its top run moving downwardly, positioning devices for automobiles on said first mentioned belts and member, electrical means for operating said devices and switches on said last mentioned member for controlling said electrical means.

These and other objects and advantages of the invention will be fully set forth in the following description made in connection with the accompanying drawings in which like reference characters refer to similar parts throughout the several views and in which:

Fig. 1 is a diagrammatic view in side elevation of the device;

Fig. 2 is a more or less diagrammatic top plan view;

Fig. 3 is a vertical section taken on line 3—3 of Fig. 2, as indicated by the arrows;

Fig. 4 is a partial view similar to Fig. 3, Figs. 3 and 4 being shown on enlarged scales respectively;

Fig. 8 is a diagrammatic view in side elevation of the control device;

Fig. 9 is a partial view in vertical section taken substantially on line 9—9 of Fig. 2, showing the reversing position of the belt;

Fig. 10 is a partial view in vertical section taken through one of the return positions of the control device belts; and Fig. 11 is a view in side elevation of a stop member used in collapsed position.

Figure 5:
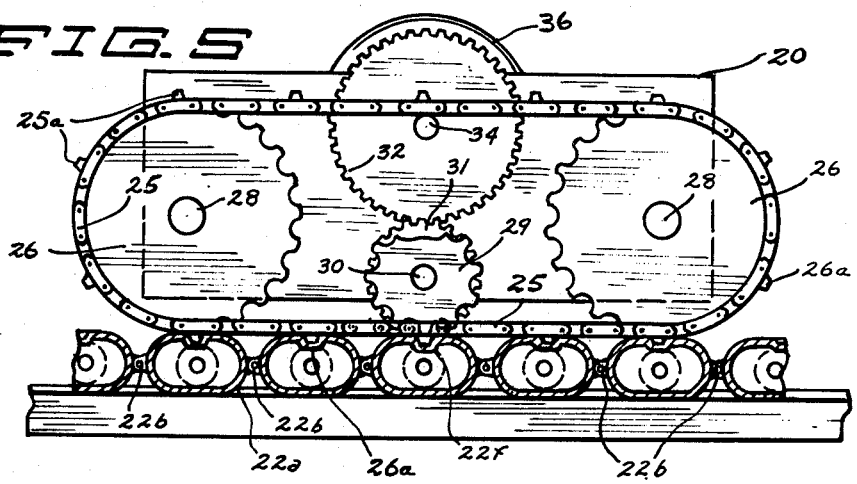
Fig. 5 is a partial sectional view taken on line 5—5 of Fig. 4, as indicated by the arrows.
Figure 6:
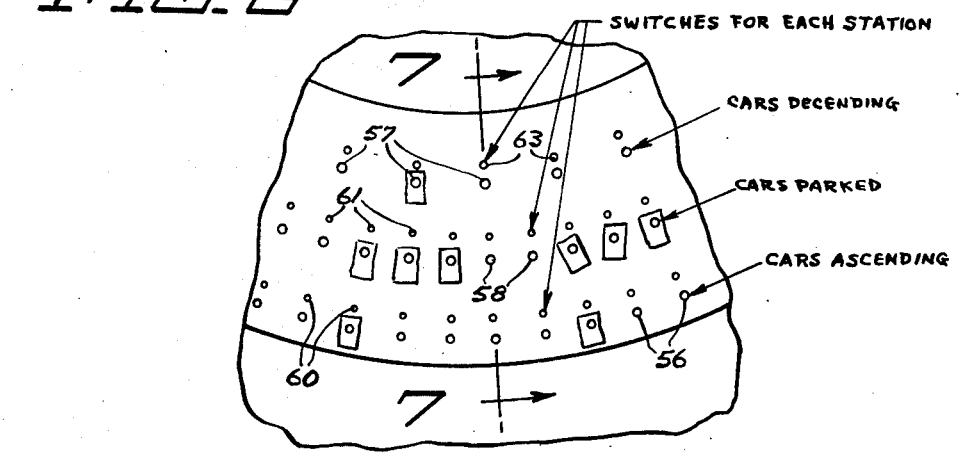
Fig. 6 is a partial plan view of the control device used.
Figure 7:
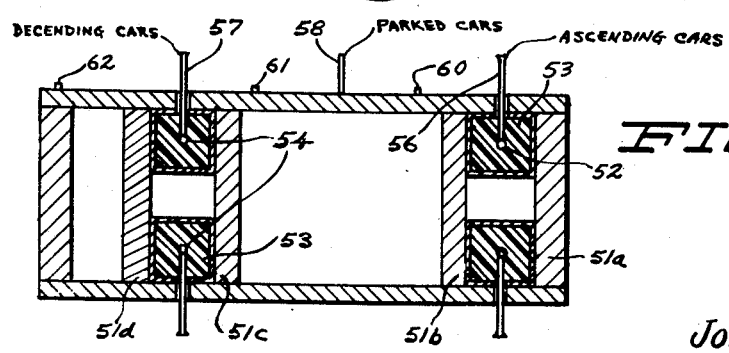
Fig. 7 is a vertical section taken on line 7—7 of Fig. 6 as indicated by the arrows.

Referring to the drawings, a device is shown comprising a frame 20. While frame 20 may be variously made, the same is illustrated as formed of a plurality of circumferentially spaced vertical members 20a. Members 20a will be connected by horizontal and diagonally spaced members 20b so that a strong rigid frame is produced. The frame 20 will be of a height extending through quite a number of stories of a building. As indicated in Fig. 1, a frame for a seven story building is shown. Supported by frame 20 is an endless belt 22. Belt 22 runs over suitable supporting rollers or sprockets 21 at its upper end and over similar supporting rollers (not shown) at its lower end (see Fig. 9). While the belt 22 could be variously made, in the embodiment of the invention illustrated, it is shown as comprising a multiplicity of tubular members 22a. Members 22a are flattened somewhat so as to be of oblong shape and will taper in width toward their inner ends. Lugs 22g on members 22 have substantially horizontal top surfaces and reduce the space between the upper sides of members 22. Members 22a are spaced rather closely and each has a number of lugs projecting from each side thereof, the lugs on adjacent members overlapping and being pivotally connected by bolts 22b. Secured in each end of members 22a is a member 22c having secured to its outer end a ball 22d. Ball 22d rotates on ball bearings 22e carried on members 22c. Tracks 24 carried on frame 20 are provided for the balls 22d at each end of members 22 so that the balls 22d travel on said tracks, as shown in Fig. 4. The belt 22 has its top run moving upwardly.

The members 22a have recesses 22f formed therein in their top sides. A chain 25 is provided running over chain sprockets 26 respectively carried on shafts 28 suitably journaled in frame 20. Chain 25 has projections 25a on certain of its links, which projections are arranged to enter the recesses 22f in the members 22a. A sprocket 29 is carried on a shaft 30 suitably journaled in frame 20. Sprocket 29 has teeth which engage in the links of chain 25 and drives chain 25. Shaft 30 also carries a gear 31 which meshes with another gear 32 carried on a shaft 34 suitably supported on frame 20. Shaft 30 has secured thereto a gear 27 which is driven by a pinion secured to the shaft 36a of a motor 36 mounted upon frame 20. Preferably there will be a plurality of motors 36 as required, and in the embodiment of the invention illustrated, four of such motors and the accompanying drive mechanism shown in Fig. 5 are provided, as indicated in Fig. 2. A plurality of such motors may be used in as many helices of belt 22 as is necessary.

Suitably mounted on the chain 22 are stop members 40. Each of these stop members comprises a bar 40a adjacent one end of which is pivoted by a pivot 40b a member 40c. Member 40c is pivoted adjacent its upper end by a pivot 40d to a link 40e, in turn pivotally connected by a pivot 40f to a lever 40g, in turn pivoted by a pivot 40h to the bar 40a. A stop member 40i is carried by a lever 40g and arranged to be engaged by the lower end portion of link 40e. A tensile coiled spring 40j is connected to the lower end of lever 40g and at its other end is connected to bar 40a. Spring 40j acts to hold the member 40c in its upright position. The core 41a of an electro-magnet 41 is disposed adjacent a block 39 of highly magnetic metal carried on a rod 39a. Rod 39a is pivotally connected to a link 43 which in turn is pivotally connected to the lower end of lever 40g. Magnet 41 will be provided with conductors 42 connected to the ends of the coil thereof. When magnet 41 is energized, the lower end of lever 40g is moved in a direction away from pivot 40b and the member 40c is swung down below the top of bar 40a, as shown in Fig. 11. Members 40g and 40e form a toggle which is slightly over dead center when the stop is in operative position.

The belt 22 is adapted to accommodate quite a large number of cars. The cars 44, as shown in Figs. 1 and 2, will be driven onto the belt 22 at the lower portion thereof where it is on a level with the ground floor of the building. An approach to the belt, as shown in Fig. 2, is designed to accommodate four cars. The cars will stand in positions radially of belt 22. At one side of belt 22, and as shown in the embodiment of the invention illustrated, at the inner side thereof, is a stationary platform 46. This platform will be divided into zones 46a having sides radial to said platform. At the inner end of the zones 46a will be stop members 40 similar to those already described for belt 22. There will be a stop member for one front wheel of the car on both belt 22 and platform 46.

At one side of platform 46 and as shown at the inner side thereof is a second belt 48. This belt will be of the same construction as belt 22 but will have its top run moving downwardly. Belt 48 will be driven by a drive mechanism, such as shown in Fig. 5, and a plurality of the motors 36 will be used to drive said belt. In Fig. 2, four of such motors are shown. As many of the motor drives will be used as found necessary. Belt 48 is provided adjacent its inner side with stops 40 already described. There will be a stop 40 for one front wheel of the cars on belt 48. Belt 48 will have half the number of car stations therein as in belt 22 and member 46.

The device comprises a control mechanism diagrammatically shown in Figs. 6 to 10. This control mechanism comprises a frame 50 similar in structure to frame 20, and a helical casing 51 is supported on frame 50. While a diameter of 200 feet is contemplated for belt 22, the diameter of the casing 51 will be in the neighborhood of 15 feet. A pair of flexible steel cables 52 and 54 will be guided in casing 51 and will have secured thereto cubical members or blocks 53. Blocks 53 can be made of plastic or other suitable material. There will be a block 53 for each station on the belt 22 and the platform 46. The blocks 53 will be guided between members 51a and 51b of the casing 51. The cable 52 will be endless and will travel in a helical path in the bottom of the control device to the top thereof, just as does the belt 52. Blocks 53 and cable 52 will be guided at their return position by casing 51, as shown in Fig. 10. Another similar endless cable 54 will travel in a helical path from the top of the control device to the bottom thereof. Cables 52 and 54 will be driven by a sprocket 70 having teeth or projections 70a which move between and propel blocks 53 and thus cable 54. Cable 54 will be similarly driven. Sprocket 70 is secured to a shaft 72. Shaft 72 is connected to a shaft 73 (see Fig. 4) to which is secured a beveled gear 74. Gear 74 meshes with a pinion 75 secured to a shaft 76. A beveled gear 78 is secured to shaft 76 with which meshes a pinion 79 secured to shaft 30. Cables 52 and 54 are thus driven in synchronism with belts 22 and 48 respectively. Cable 54 will have blocks 53 secured thereto, similar in all respects to the blocks 53 secured to cable 52, and like blocks 53 on cable 52 will move between partitions 51c and 51d. Secured to each of the blocks 53 are pins 56 and 57. Pins 56 will be on the blocks secured to cable 52 and pins 57 will be on the blocks secured to cable 54. Stationary pins 58 will be disposed in the top of casing 51 and there will be one pin 58 on each station on the stationary platform 46. Switches 60 are secured to the top of casing 51 in spaced relation thereon and there will be one of the switches 60 for each station on the ascending belt 22. Other switches 61 will be carried by casing 51 in spaced relation and there will be the same number of switches 61 as of the switches 60. Other switches 62 will be provided in casing 51 and there will be one of the switches 63 for each station on belt 48, or half the number of switches 60. Switches 60, 61 and 62 will be connected respectively to the magnets 41 for operating the stops 40 on belt 22, platform 46 and belt 48.

In operation, the automotive vehicles will drive onto the belt 22 when the same is stationary. The portion of the belt driven upon will be at the floor level of the building. When one to four cars have been driven onto belt 22, the belt will be moved to bring an empty space in front of each of the drive-on positions. The cars on belt 22 will be held in stationary position by having one of their front wheels engaging the stops 40. When it is desired to move a car from belt 22 onto the stationary platform 46, the switch 60, which will correspond to the position on belt 22 occupied by said car, will be operated. It will be understood that the operator can stand in the center of the casing 51 and all of the switches 60 and 61, as well as the pins 56, 57 and 58, and can move by walking or on a movable member such as a stool on rollers so that all of said switches and all of pins 56, 57 and 58 will be within his reach. When said switch 60 is operated, the holding device 40 will move to non-stop position by action of the magnet operating the same and the automobile will then roll downwardly onto stationary platform 46 and will engage the stop 40 on said platform. The automobile is now parked on the stationary platform 46 and will remain there until the user wishes to secure it. When it is desired to bring a car on platform 46 down to the lower floor level, the operator will press on the switch 61 corresponding to the position or station on platform 46 occupied by said automobile. This will operate the stop 40 on platform 46 holding said automobile and the automobile will then roll onto descending belt 48 and will engage the stops 40 on belt 48. Belts 22 and 48 are of course stationary when cars are being moved relatively thereto. Belt 48 will then be moved until the said automobile reaches the drive-off position on the lower floor. The user can then again take charge of his car and the proper stop 40 on belt 48 will be operated by a switch 62 and the user can drive said car off of belt 48. When a car is driven onto belt 22 a ticket made out for said car will be placed on the pin 56 corresponding to the station occupied by the car. The control device will have positions or stations thereon corresponding to all of the positions on belts 22 and 48 and platform 46. There will be fewer helices on the control device than on the ramp so that one helix on the control device will carry stations for several helices on the ramp. When the said car is moved to the stationary platform this ticket will be placed on the pin 58 corresponding to the station on platform 46 occupied by said car. When the said car is to be brought down to the floor level, said ticket for said car will be placed on pin 57. Said car will then be identified when it reaches the lower floor. The said tickets can have different colors for each helix on the ramp, and may also carry symbols or characters showing the ramp in which the car is parked. Each helix on the ramp could be divided into a number of groups and the group could be marked to correspond to the tickets used therewith. The operator of the control device thus has a vision comprising all of the cars on the ramp and can control the operation of the belts 22 and 48 to locate the cars on the stationary platform and to remove the cars therefrom.

From the above description it will be seen that I have provided a parking ramp structure which will accommodate a large number of automotive vehicles. It is contemplated to build a fifteen story device. As stated, the cars can drive onto the elevating member or belt at the ground floor. After the cars are on this belt, they can be controlled by one person from the control device. The parking ramp will be provided with the necessary motor control (not shown) for intermittently rotating the desired belt. This will only necessitate one switch for starting the driving motors on each of the belts. The ascending and descending belts can be moved quite rapidly so that the vehicles can be very efficiently handled. The device is designed so that it can be operated and serviced by one person. This will greatly cut down the operating expense. It is obvious that the structure will have a high degree of utility for the purpose intended.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. An apparatus for parking automotive vehicles having in combination, an endless helical conveyor having an upwardly traveling top run for carrying said vehicles, a helical ramp at one side of said conveyor positioned so that said vehicles can be moved from said conveyor onto said ramp, and a second endless helical conveyor at the opposite side of said ramp for carrying said vehicles having its top run moving downwardly so that said vehicles can be moved from said ramp onto said second conveyor.

2. An apparatus for parking automotive vehicles having in combination, an endless helical conveyor for carrying said vehicles having its top run movable upwardly, said top run sloping downwardly toward the inner side of said conveyor, a helical ramp at the inner side of said conveyor having its top surface inclined and positioned so that said vehicles can be moved from said conveyor onto said ramp, and a second endless helical conveyor for carrying said vehicles at the opposite side of said ramp having its top run inclined downwardly and upwardly and positioned so that said vehicles can be moved from said ramp onto said second conveyor.

3. An apparatus for parking automotive vehicles having in combination, an endless flexible helical conveyor for carrying said vehicles having its top run movable upwardly and having its top surface inclined downwardly toward its inner side, a helical ramp at the inner side of said conveyor and having its surface inclined downwardly and inwardly and positioned so that vehicles can be passed from said conveyor onto said ramp, and a second endless flexible helical conveyor for carrying said vehicles at the inner side of said ramp and having its top surface inclined downwardly and inwardly and positioned so that said vehicles can be moved from said ramp onto said second conveyor.

4. The structure set forth in claim 2, and a series of circumferentially spaced stop members disposed so as to be engaged by portions of said vehicles on said first mentioned conveyor.

5. The structure set forth in claim 2, a series of circumferentially spaced stop members on said ramp and on said conveyors respectively adapted to be engaged by portions of said vehicles disposed respectively on said ramp and conveyors, and means for moving said stop members to inoperative position so that said vehicles may be moved from one conveyor onto said ramp and from said ramp onto the other conveyor.

6. An apparatus for parking automotive vehicles having in combination, a frame, a pair of vertically spaced helical tracks on said frame, an endless helical flexible conveyor adapted to support automotive vehicles having its upper run supported on and movable on said upper track, said conveyor comprising transversely extending flattened tubes swingingly connected at their adjacent portions and adapted to form a substantially flat even continuous surface and having rotatable bearing members supported on said tracks, means for retaining vehicles on said conveyor and remote control means for operating said means.

7. The structure set forth in claim 6, said tubes having longitudinally extending grooves in the sides thereof, a driven chain above said conveyor, members projecting from said chain adapted to move into said grooves and propel said conveyor.

8. The structure set forth in claim 6, said tubes having longitudinally extending grooves in one side therof, a link chain movable above said tubes, members projecting from the links of said chain and movable into said grooves for propelling said tubes and conveyor.

9. The structure set forth in claim 6, said tubes having grooves in their upper sides, a link chain movable over said tubes, spaced sprockets over which said chain moves, said chain moving parallel to said tubes and held in position by said sprockets, and projections on the links of said chain arranged to enter said grooves and propel said conveyor.

10. The structure set forth in claim 9, a third sprocket above said chain having means engaging said chain for driving the same, and means for driving said third sprocket.

11. The structure set forth in claim 10, a shaft on which said third sprocket is carried, a gear secured to said shaft, a second gear meshing with said gear, and a shaft to which said second gear is secured, and means for driving said shaft.

12. An apparatus for parking automotive vehicles having in combination, an endless helical conveyor for carrying said vehicles having an upwardly traveling top run, a helical ramp at one side of said conveyor positioned so that said vehicles can be moved from said conveyor onto said ramp, a second endless helical conveyor at the opposite side of said ramp having its top run moving downwardly so that said vehicles can be moved from said ramp onto said second conveyor, and a remote control device having a helical endless member having an upwardly movable portion and members carried on said member adapted to hold identifying members corresponding respectively to the vehicles on said first mentioned conveyor to show the respective positions of said vehicles.

13. The structure set forth in claim 12, said remote control device comprising a second endless helical member having a downwardly moving portion and members on said last mentioned portion for holding said identifying members.

14. An apparatus for parking automotive vehicles having in combination, an endless helical conveyor having an upwardly traveling top run for carrying said vehicles, a helical ramp at one side of said conveyor positioned so that said vehicles can be moved from said conveyor onto said ramp, a second endless helical conveyor at the opposite side of said ramp for carrying said vehicles having its top run moving downwardly so that said vehicles can be moved from said ramp onto said second conveyor, a series of circumferentially spaced stop members disposed so as to be engaged by portions of said vehicles on said first mentioned conveyor, and a remote control device having a helical casing, means for moving said stop members to inoperative positions respectively, said casing having switches thereon for operating said last mentioned means.

15. The structure set forth in claim 2, a series of circumferentially spaced stop members on said ramp and on said conveyors respectively adapted to be engaged by portions of said vehicles disposed respectively on said ramp and conveyors, means for moving said stop members to inoperative position so that said vehicles may be moved by gravity from one conveyor onto said ramp and from said ramp onto the other conveyor, and a remote control device comprising a casing for operating said means, said means including spaced switches on said casing.

16. The structure set forth in claim 2, a series of circumferentially spaced stop members on said ramp and on said conveyors respectively adapted to be engaged by portions of said vehicles disposed respectively on said ramp and conveyors, means for moving said stop members to inoperative position so that said vehicles may be moved from one conveyor onto said ramp and from said ramp onto the other conveyor, said last mentioned means comprising electro-magnetic means connected to said stop members, a remote control device comprising a stationary member and spaced switches on said member for actuating said electro-magnetic means.

17. An apparatus for parking automotive vehicles having in combination, an endless helical conveyor having an upwardly traveling top run for carrying said vehicles, a helical ramp at one side of said conveyor positioned so that said vehicles can be moved from said conveyor onto said ramp, a second endless helical conveyor at the opposite side of said ramp for carrying said vehicles having its top run moving downwardly so that said vehicles can be moved from said ramp onto said second conveyor, a series of circumferentially spaced stop members disposed so as to be engaged by portions of said vehicles on said first mentioned conveyor, a remote control device comprising an endless helical member moving in synchronism with said first mentioned helical conveyor and having thereon control means for said stop members for controlling the movement of said vehicles from said first mentioned conveyor onto said ramp and from said ramp onto said second conveyor.

References Cited in the file of this patent

UNITED STATES PATENTS

| 782,009 | Dodge | Feb. 7, 1905 |
| 1,585,471 | D'Humy | May 18, 1926 |
| 1,598,507 | Robbins | Aug. 31, 1926 |
| 1,772,110 | Randle | Aug. 5, 1930 |
| 1,804,338 | Henderson | May 5, 1931 |
| 1,868,894 | Glahn | July 26, 1932 |
| 2,093,270 | Glinka | Sept. 14, 1937 |
| 2,631,743 | Hornick | Mar. 17, 1953 |
| 2,641,351 | Riley | June 9, 1953 |

FOREIGN PATENTS

| 217,432 | Great Britain | June 19, 1924 |